(No Model.) 4 Sheets—Sheet 1.

G. JULIAN.
SOLE ROUNDING MACHINE.

No. 446,686. Patented Feb. 17, 1891.

WITNESSES.
INVENTOR.

(No Model.) 4 Sheets—Sheet 2.

G. JULIAN.
SOLE ROUNDING MACHINE.

No. 446,686. Patented Feb. 17, 1891.

WITNESSES. INVENTOR.

(No Model.) 4 Sheets—Sheet 3.

G. JULIAN.
SOLE ROUNDING MACHINE.

No. 446,686. Patented Feb. 17, 1891.

WITNESSES.
Henry Marsh.
A. D. Harrison.

INVENTOR.
G. Julian
Attys (No Model.) 4 Sheets—Sheet 4.

G. JULIAN.
SOLE ROUNDING MACHINE.

No. 446,686. Patented Feb. 17, 1891.

WITNESSES.   INVENTOR.

UNITED STATES PATENT OFFICE.

GIDEON JULIAN, OF BOSTON, MASSACHUSETTS, ASSIGNOR OF ONE-HALF TO S. M. FAY, OF SAME PLACE.

SOLE-ROUNDING MACHINE.

SPECIFICATION forming part of Letters Patent No. 446,686, dated February 17, 1891.

Application filed July 5, 1890. Serial No. 357,768. (No model.)

*To all whom it may concern:*

Be it known that I, GIDEON JULIAN, of Jamaica Plain, Boston, in the county of Suffolk and State of Massachusetts, have invented certain new and useful Improvements in Sole Trimming or Rounding Machines, of which the following is a specification.

This invention has for its object to provide a simple and effective machine for trimming or rounding soles of boots or shoes; and it consists in the improvements which I will now proceed to describe and claim.

Figure 1:
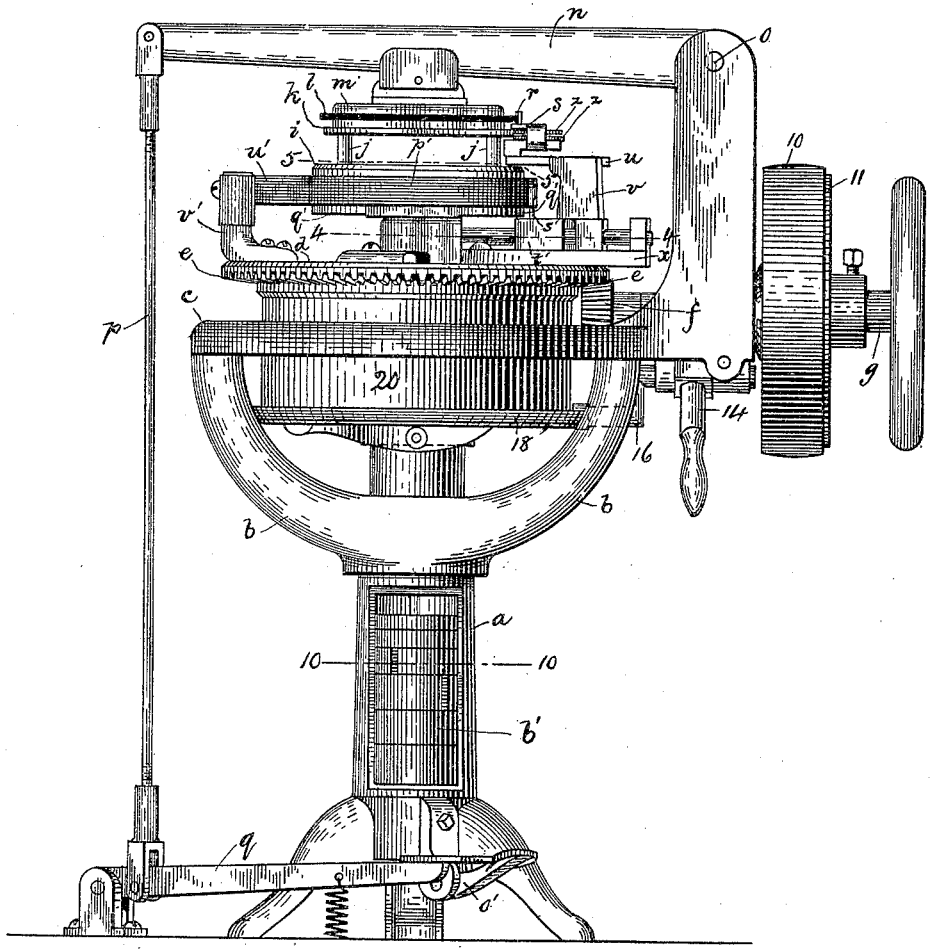
Figure 10:
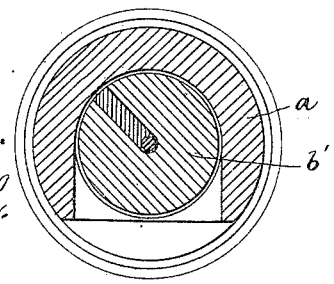
Figure 2:
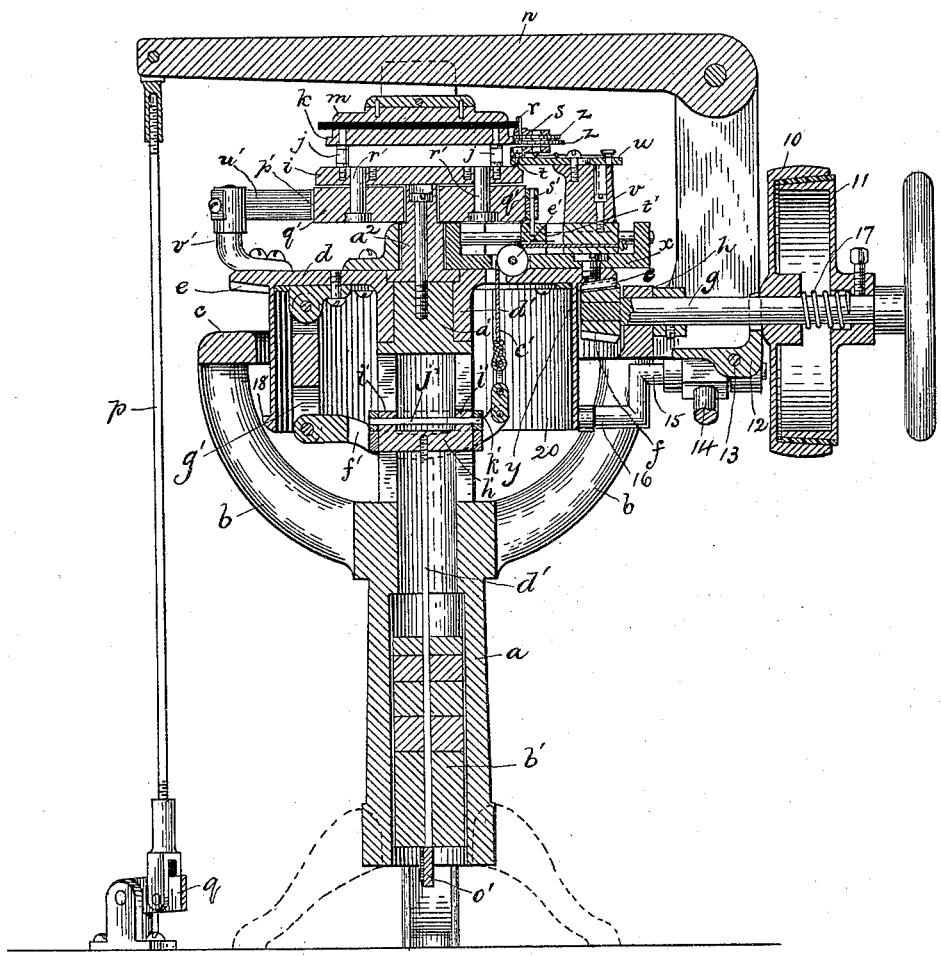
Figure 11:
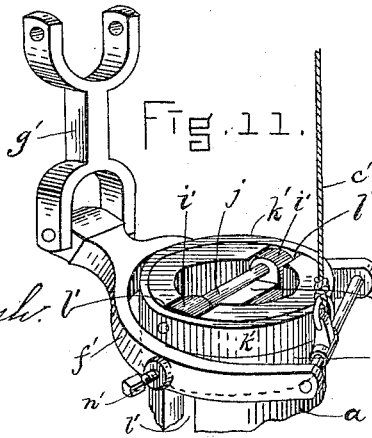
Figure 3:
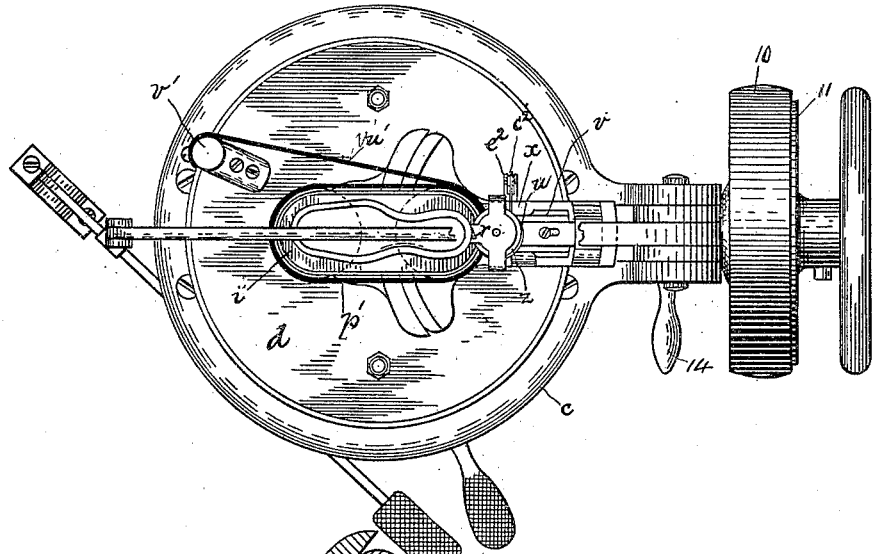
Figure 4:
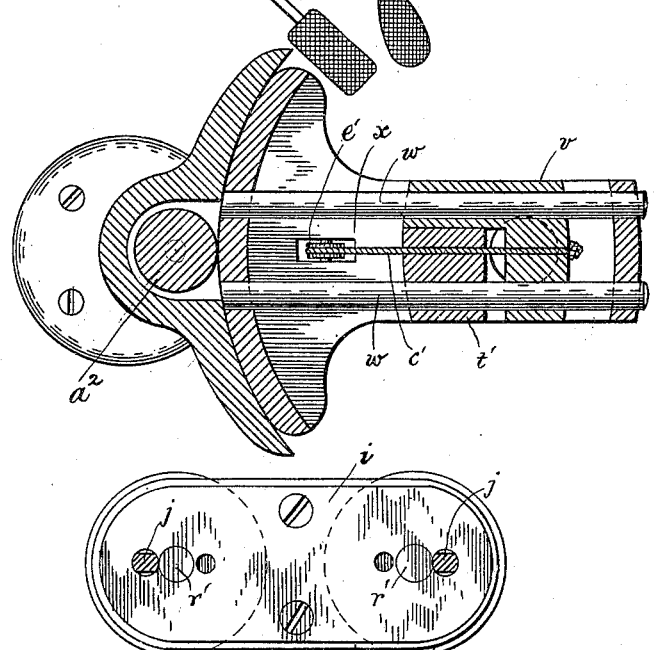
Figure 5:
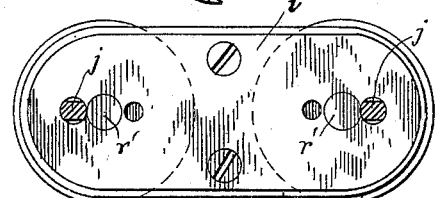
Figure 6:
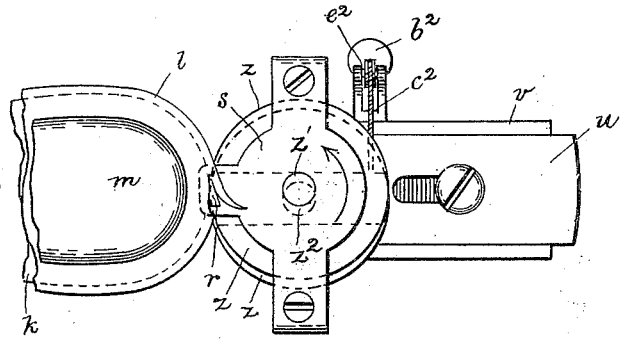
Figures 7, 8:
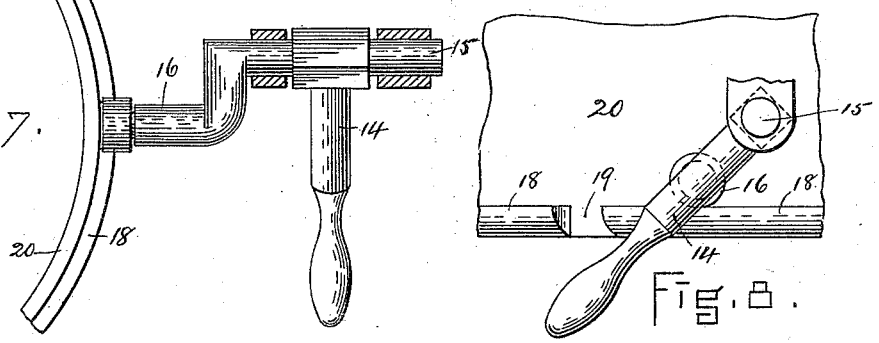
Figure 9:
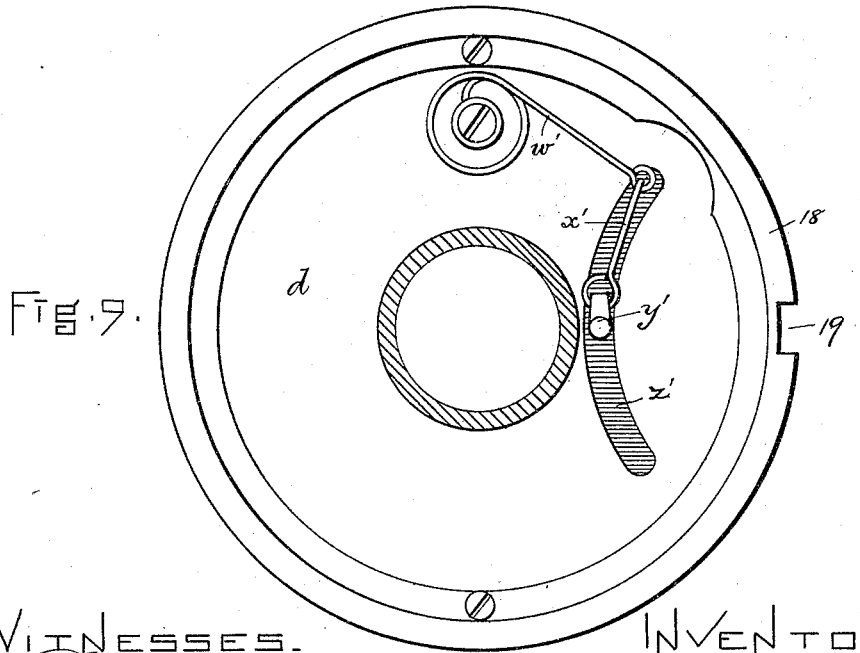

Of the accompanying drawings, forming a part of this specification, Figure 1 represents a side elevation of a sole trimming or rounding machine embodying my invention. Fig. 2 represents a vertical central section of the same. Fig. 3 represents a top plan view. Fig. 4 represents an enlarged section on line 4 4, Fig. 1. Fig. 5 represents a section on line 5 5, Fig. 1, looking downwardly. Fig. 6 represents an enlarged top view of portions of the machine shown in Fig. 3. Fig. 7 represents a top view, and Fig. 8 a side view, of a portion of the machine. Fig. 9 represents a bottom view of a portion of the machine. Fig. 10 represents a section on line 10 10, Fig. 1. Fig. 11 represents a perspective view of a portion of the machine.

The same letters of reference indicate the same parts in all the figures.

In the drawings, $a$ represents a standard or pedestal on which are formed arms $b$, supporting a circular frame $c$, the whole constituting a frame of suitable form to support the mechanism hereinafter described; but it will be understood that I do not limit myself to this particular construction of supporting-frame, but may make said frame of any suitable form.

$d$ represents a horizontal rotary bed or table, which is fitted to rotate on the standard $a$, the upper end of the latter being reduced to form a bearing $a'$, Fig. 2, on which a downwardly-projecting socket or hub $d'$, formed on the bed $d$, is adapted to rotate. The bed $d$ is provided at the under side of its margin with bevel gear-teeth constituting a bevel-gear $e$, with which meshes a bevel-pinion $f$ on a shaft $g$, which is journaled in a fixed bearing $h$ on the supporting-frame and is driven by power suitably applied, as hereinafter described, the bed being rotated by the rotation of the shaft.

$i$ represents a fixed horizontal plate or holder, which is rigidly attached to the upper portion $a'$ of the standard $a$ by means of a short supplemental standard $a^2$, Fig. 2, bolted to said portion $a'$. Said plate or holder $i$ supports two short studs $j\ j$, which in turn support the bottom clamp or pattern $k$, on which the sole-blank $l$ rests during the trimming operation, said clamp having the edge contour which it is desired to impart to the sole and serving as a guide for the trimming-knife, which is carried around the clamp (which does not rotate) by the rotating table $d$, as hereinafter described.

The sole-blank is confined on the bottom clamp $k$ by a top clamp $m$ of similar form, said top clamp being vertically movable and held down upon the sole-blank by means of a lever $n$, which is pivoted at $o$ to a fixed ear on the supporting-frame and bears on the top clamp $m$ at a point between its pivoted and free ends, its free end being connected by a rod $p$ with a treadle $q$, so that it can be forced downwardly to firmly hold the top clamp on the sole by the operator's foot and raised from the sole by an upward movement of said treadle.

The trimming-knife $r$ is attached to a swinging yoke or holder $s$, which is pivoted at $t$, Fig. 2, to an arm $u$, adjustably secured to a knife-carrier $v$. Said carrier is fitted to slide on horizontal guide-rods $w$, attached to a base-plate $x$, which is pivoted at $y$, Fig. 2, to the bed or table $d$, and is adapted to oscillate on its pivot while the latter is being revolved by the rotary motion of the bed.

The knife-holder $s$ is pivoted to the carrier at a point directly under the cutting-edge of the knife, said edge being preferably on the axial line of the pivot, so that when the knife-holder swings in passing along the curves of the clamp, as hereinafter described, the displacement of the cutting-edge will be reduced to the minimum. The pivoted knife-holder is provided with two rollers $z\ z$, one above the other. Said rollers are of the same diameter and are arranged to bear simultaneously on the edge of the clamp. Their axes are arranged out of line with each other, as shown in Fig. 6, where the axis $z'$ of the upper roller is shown in full lines and the axis $z^2$ of the lower roller is shown in dotted lines. This arrangement of the rollers causes them to bear on the clamp $k$ at different points, so that the position of the pivoted knife-holder is controlled by the shape of the edge of the clamp, the extended bearing of the two rollers on the edge of the clamp preventing the knife-holder from swinging loosely on its pivot, as will be readily seen. The knife-holder is provided with a weight $b^2$, which is connected to the holder by a cord or chain $c^2$, running over a pulley $e^2$ on the knife-carrier $v$, said weight drawing the knife-holder in the direction indicated by the arrow in Fig. 6, and thereby keeping the rollers $z\,z$ in close contact with the edge of the clamp $k$ when the knife-carrier is moving around said clamp, as hereinafter described.

The knife-carrier is normally drawn inwardly to hold the rollers $z\,z$ with a yielding pressure against the edge of the guiding-clamp $k$ by means of weights $b'$, suspended by a rod $d'$ from a lever $f'$, which is pivoted at one end to a link or hanger $g'$, depending from the bed or table $d$, and is connected at the other end with a cord or chain $c'$, passing over a pulley $e'$ on the base-plate $x$ to the knife-carrier $v$. The weights are located within the standard $a$, which is of tubular form, and they exert a sufficient pull or tension on the cord $c'$, through the yoke or lever $f'$, to draw the knife-carrier $v$ inwardly on the guides $w\,w$ and hold the rollers $z\,z$ on the knife-holder against the bottom clamp $k$. The location of the weights within the non-rotating standard $a$ requires such a connection between the weight-suspending rod $d'$ and the yoke or lever $f'$ (the latter being connected with the rotary table and caused to revolve about said standard) as will permit the said rod and the weights thereon to rise and fall without rotating. To this end I attach the rod $d'$ to a cross-bar $h'$, the ends of which have ears $i'\,i'$, which are connected by a pivot $j$ with a ring $k$, adapted to move vertically upon the exterior of the standard $a$, the ends of the bar $h'$ moving in vertical slots $l'$ in said standard, Figs. 2 and 11. The ring $k'$ rests upon another ring $m'$, which is also adapted to move vertically upon the standard $a$, and is connected by pivots $n'$ with the yoke or lever $f'$, said ring $m'$ being adapted to rotate on the standard, and thus conform to the movements of the yoke or lever $f'$ when the same is revolved about said standard by the rotation of the bed or table $d$. The weights $b'$ may be raised to remove the described pressure from the knife-carrier when it is desired to move the knife back from its operative position; and to this end I provide a foot-lever $o'$, which is pivoted to ears on the lower portion of the standard $a$ and is arranged so that one of its ends bears on the bottom weight $b'$ and is adapted to raise the weights when the other end of the lever is depressed.

$p'$ represents a belt, which is preferably of sheet-steel, extending around two pulleys $q'\,q'$, which are journaled on studs $r'\,r'$, attached to the clamp-supporting plate $i$. Said belt is connected with a stud $s'$, projecting upwardly from a block $t'$, which is adapted to slide on the guides $w\,w$ on the base-plate $x$, said block and the knife-carrier being adapted to move independently of each other on said guides. A strap $u'$, which may be of sheet-steel, like the belt, is attached at one end to the belt at or near the point where the latter is attached to the block $t'$, the other end of said strap being attached to an arm $v'$ on the bed or table $d$ near the margin of the latter.

It will be seen that the rotation of the bed or table $d$ causes the knife-carrier $v$ to move about the clamp $k$, the weights $b'$, connected with said carrier, causing the carrier to move in and out in conformity to the contour of the clamp, the knife being thus moved progressively along the margin of the clamp.

The pulleys $q'\,q'$ are arranged to hold the belt $p'$ so that it is approximately parallel with the margin of the sole-clamp $k$, as shown in Fig. 3. Hence the rotation of the bed or table causes the block $t'$ on the guides of the base-plate $x$ to move in close proximity to the margin of the clamp $k$. The base-plate $x$ is thus controlled at two points—viz., at the pivot $y$, Fig. 2, which connects it with the bed or table $d$, and at the stud $s'$, which connects the block $t'$ with the belt $p'$—or, in other words, the base-plate has two connections with the rotary bed or table, one being the direct and positive connection afforded by the pivot $y$ and the other being the indirect and flexible connection afforded by the sliding block $t'$, stud $s'$, belt $p'$, and strap $u'$. The result of this double connection is to give the knife-holder a varying movement, its speed being faster when it is moving along the sides of the clamp $k$ than when it is moving around the toe and heel. This difference is due to the fact that when the knife-carrier is moving along the sides of the clamp the block $t'$ is farther from the pivot $y$ than when the carrier is moving along the heel and toe portions. Hence when the knife-carrier is moving along the side portions the inner end of the base-plate is given a forward movement in addition to the movement of its pivot, and when the knife-carrier is moving along the heel and toe curves the movement of the inner end of the base-plate is retarded, said end being swung backwardly by a spring $w'$, Fig. 9, attached to the bottom of the bed or table $d$, and having its free end connected by a link $x'$ with a stud $y'$, projecting downwardly through a segmental slot $z'$ in the bed or table $d$. Said spring, by giving the inner end of the base-plate a backward movement when its progressive movement is retarded by the outward movement of the block, prevents slackening of the belt $p'$ and strap $u'$ by said retarded movement. By thus varying the movement of the knife, so that it moves more slowly at the heel and toe than at the side portions of the clamp, the knife is caused to do better work at the heel and toe portions than it could do if its movement were not thus varied, the knife being enabled, if desired, to trim very abrupt curves, such as those of a "square toe," so called.

Power is applied to the shaft to rotate the bed or table $d$ by means of a belt running from a suitable driving-shaft onto a friction-pulley 10, which is normally loose on the shaft $g$, and is adapted to be engaged by a clutch-pulley 11, affixed to said shaft. The friction-pulley is pressed against the clutch-pulley during the operation of the machine by means of a bell-crank lever 12, pivoted at 13 to the supporting-frame, one arm of said lever bearing against the hub of the pulley 10, while its other arm projects over a lever 14, which is attached to rock-shaft 15, journaled in the supporting-frame. When said lever 14 is in a raised position, the bell-crank lever 12 is thereby caused to press the pulley 10 against the clutch-pulley 11 and make the friction-pulley fast on the shaft $g$; but when the lever 14 is allowed to drop a spring 17, Fig. 2, interposed between the clutch 11 and pulley 10, throws back the pulley and makes it loose. The rock-shaft 15 has an arm or crank 16, which bears on a flange 18, formed on a cylindrical shell or casing 20, attached to the bed or table $d$. Said flange has an opening 19 at one point in its periphery, (see Fig. 8,) which opening when it reaches the crank 16 permits the latter to drop and thus constitute a stop, which, by engaging the sides of the opening 19, prevents further rotation of the bed or table. The flange 18 is arranged so that when it supports the crank 16 the lever 14 is held in its raised position, and thus caused to engage the pulley 10 with the clutch 11 through the bell-crank lever 12, as above described, and when the opening 19 receives the crank the pulley 10 is allowed to separate from the clutch 11, as above described. The motion of the bed or table is thus automatically stopped after each complete rotation.

I claim—

1. In a sole-trimming machine, the combination of a rotary bed or table, a fixed clamp-holder above the same, a sole-clamp attached to said holder, a movable top clamp and means for raising and depressing the same, a base-plate having a direct pivotal connection with the bed at one point and an indirect movable connection with the bed at another point, a knife-carrier movable on guides on said base-plate, means for applying yielding inward pressure to the knife-carrier, and a knife-holder pivoted to the carrier and arranged to bear against the sole-clamp, the direct pivotal connection and indirect movable connection of the bed to the base-plate giving the knife-holder a varying movement, as set forth.

2. In a sole-trimming machine, the combination of a rotary bed or table, a fixed clamp-holder above the same, a sole-clamp attached to said holder, a movable top clamp and means for raising and depressing the same, a base-plate, a pivot $y$, directly connecting the base-plate to the bed or table, a block movable on guides on the base-plate, a belt supported by pulleys on the clamp-holder, devices, substantially as described, connecting said belt with the block on the base-plate, a strap connecting the belt with the rotary bed or table, a knife-carrier movable on the guides on the base-plate, means, substantially as described, for applying a yielding inward pressure to the knife-carrier, and a knife-holder pivoted to the carrier and arranged to bear against the sole-clamp, as set forth.

3. The combination of the fixed sole-clamp, the knife-carrier adapted to travel around the clamp, the knife-holder pivoted to said carrier and provided with the knife $r$, and two rollers $z\ z$ on said holder, arranged to rotate on different centers and to bear simultaneously on the margin of the clamp, whereby the knife-holder is given an elongated bearing on the clamp, as set forth.

4. The combination of the rotary bed or table, the base-plate pivotally connected thereto, the knife-carrier movable on guides on the base-plate, the fixed tubular supporting-standard, the weights suspended within said standard, the lever pivotally connected with the bed or table at one end and with the knife-carrier at the other end, a ring pivoted to said lever and adapted to rotate on the standard, a ring vertically movable on said standard without rotating thereon and bearing on the rotatable ring, and a cross-bar pivoted to the non-rotating ring and engaged with the weights, said cross-bar being movable in vertical slots in the standard, as set forth.

5. The combination, with the base-plate and the knife and knife-carrier movable in guides thereon, of the rotary bed or table having the flange 18, the latter having the opening 19, the rock-shaft having a crank 16 bearing on said flange and adapted to drop through said opening, the shaft having the fixed clutch-pulley and the loose friction-pulley, and connections, substantially as described, between the rock-shaft and loose pulley, whereby the loose pulley is engaged with the clutch-pulley when the crank of the rock-shaft is on the flange and disengaged when said crank is in the opening in said flange, as set forth.

In testimony whereof I have signed my name to this specification, in the presence of two subscribing witnesses, this 28th day of June, A. D. 1890.

GIDEON JULIAN.

Witnesses:
C. F. BROWN,
A. D. HARRISON.